Oct. 29, 1968     E. W. NICHOLS     3,408,021
FISHING REEL
Filed Oct. 21, 1965     2 Sheets-Sheet 1
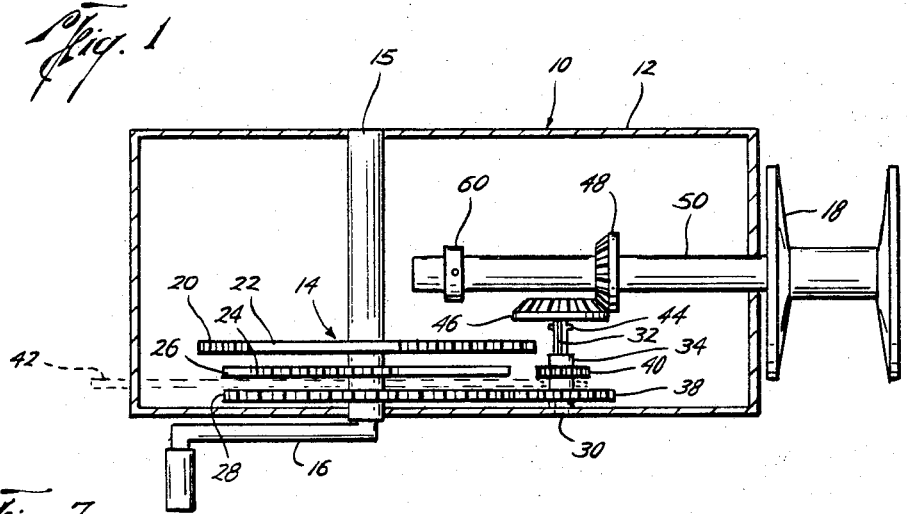
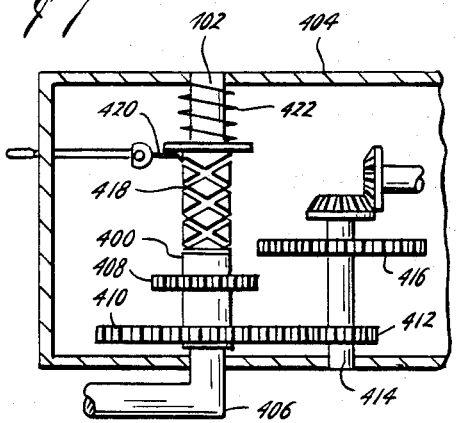
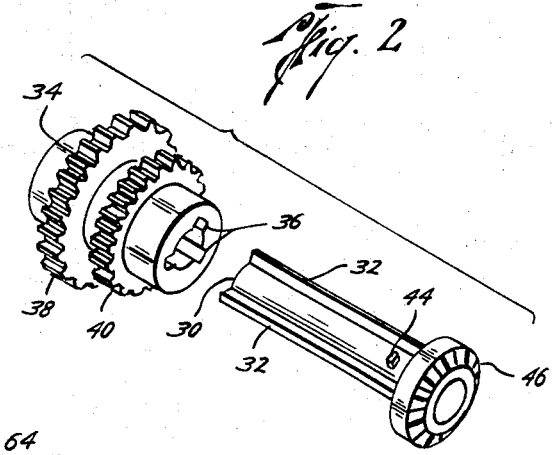
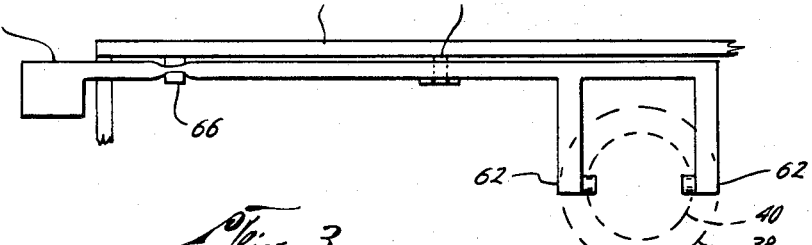
Earl W. Nichols
INVENTOR.
BY James F. Writer
Wm. A. Stout
Paul L. DeVester II
Dudley R. Dobie, jr.
ATTORNEYS Oct. 29, 1968 E. W. NICHOLS 3,408,021
FISHING REEL
Filed Oct. 21, 1965 2 Sheets-Sheet 2

Earl W. Nichols
INVENTOR.

BY James F. Weiler
Wm. A. Stout
Paul L. DeVerter II
Dudley R. Dobie, Jr.
ATTORNEYS United States Patent Office 3,408,021
Patented Oct. 29, 1968

3,408,021
FISHING REEL
Earl W. Nichols, 7804 Mullen Drive,
Austin, Tex. 78757
Filed Oct. 21, 1965, Ser. No. 499,943
12 Claims. (Cl. 242—84.54)

ABSTRACT OF THE DISCLOSURE

A fishing reel having a gear box driving a line collecting spool and driven by a winding handle. The gear box is provided with a plurality of gears for alternating take-up of the line fast and slow by continuous rotation of the handle.

---

This invention relates to improvements in fishing reels and in particular to an improved reel capable of imparting "professional" or slow-fast motion to a bait to attract fish.

The utility of a spinning or casting reel in sports fishing is normally limited to making desired directional casts and retrieving the bait by a winding operation. Reels have been developed which improve winding and reciprocating mechanisms for easier castings as well as imparting intermittent rotation to the winding spool thereby providing intermittent movement of a bait at the end of the line. Such intermittent movement has been an attempt to simulate movement of a live insect while using artificial lures. These reels have experienced minimal success. The present invention provides an improved fishing reel which imparts "professional" or continuous alternating slow-fast movement to an artificial bait rather than intermittent movement and therefore produces actions more closely simulating live insects when casting with artificial baits.

It is, therefore, an object of the present invention to provide an improved casting reel which imparts slow-fast movement to an artificial bait thereby simulating live insects.

A further object of this invention is to provide an improved fishing reel which imparts slow-fast motion to a bait while operating the reel by continuous winding without having to consciously alter winding speed of the reel.

Still another object of this invention is to provide an improved fishing reel which will retrieve a bait in a conventional manner or in a "professional" slow-fast manner by a quick adjustment of the reel.

Yet a still further object of the present invention is the provision of an improved fishing reel which imparts "professional" slow-fast movement to a bait by means of a gear box having at least one gear with an interrupted face in combination with suitable winding handle, spool and support means.

Still another object of the present invention is to provide an improved fishing reel which imparts "professional" slow-fast movement to a bait by means of a gear box having a sliding gear arrangement in combination with winding, spool and support means.

Other and further objects, features and advantages will be apparent from the following description of a presently preferred embodiment of the invention, given for the purpose of disclosure, and taken in conjunction with the accompanying drawings, where like character references designated like parts throughout the several views, and where:

FIGURE 1 is a partial cross-sectional plan view of the present invention,

FIGURE 2 is an exploded perspective view of sliding gear means of FIGURE 1,

Figure 4:
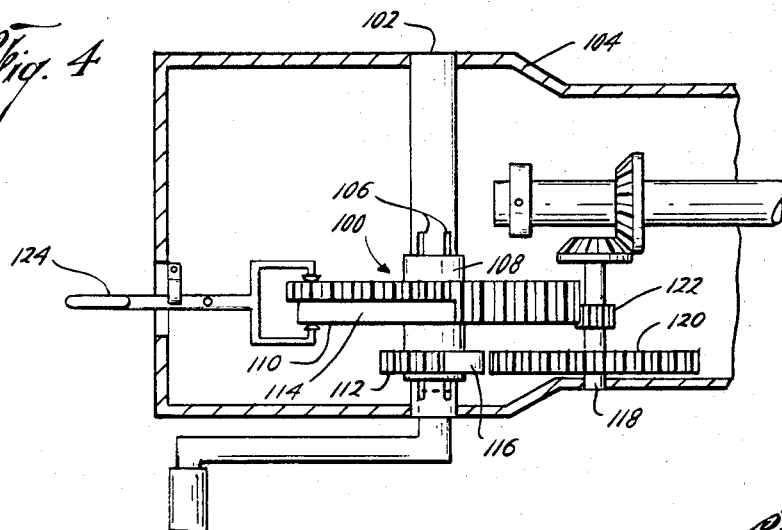
Figure 5:
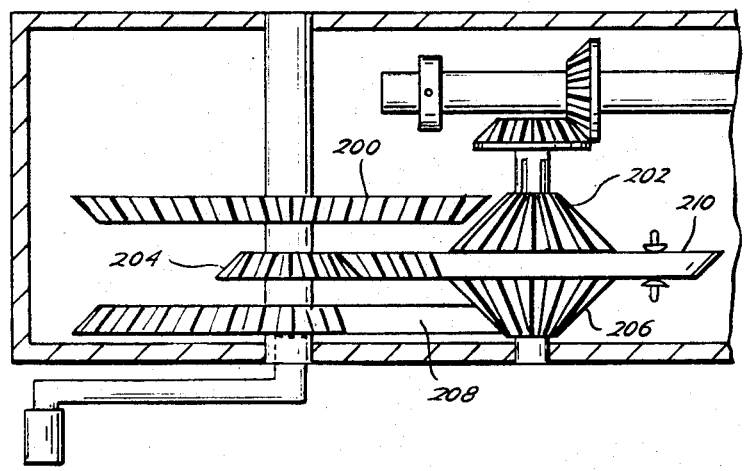
Figure 6:
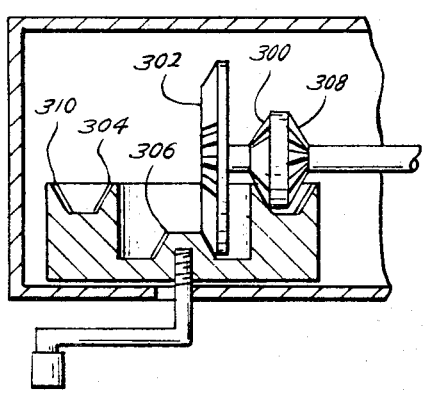

FIGURE 3 is a partial side view of gear adjusting means shown in outline in FIGURE 1, FIGURE 4 is a partial cross-sectional plan view of a modified embodiment of the present invention, FIGURE 5 is a partial cross-sectional plan view of still another modified embodiment of the present invention, FIGURE 6 is a partial cross-sectional plan view of a further embodiment of the present invention, and FIGURE 7 is a partial cross-sectional plan view of still another embodiment of the present invention.

Generally, the present invention comprises a gear box in combination with a spool on which line is wound and a handle to effect the winding operation. The gear box is unique in that it has at least two pairs of gears wherein one gear in each pair has an interruption of teeth on its face. The gears are of proper ratio and spaced face interruption such that upon mesh operation and coaction with the winding spool and line, a bait attached to the line may be reeled in continuously without excessive jerking or unrhythmic winding and with alternating slow-fast movement. This movement is known as "professional" action of an artificial bait. An alternative gear box has a sliding gear assembly to accomplish a similar result.

Referring now to the drawings, and particularly to FIGURE 1, the reference numeral 10 generally designates the improved fishing reel of the present invention which includes a frame member 12 to enclose and support the gear box designated generally by the reference numeral 14. A winding handle 16 operates the gear box 14 which coacts with a suitable spool 18 on which the line containing a bait is to be wound.

The gear box 14 comprises a shaft 15 journaled or otherwise rotatably connected at both ends with the frame or support 12. Securely mounted on the shaft 15 is a first spur gear 20 having an interruption 22 of its face as shown. A second spur gear 24 is positioned on the shaft 15 and is provided with an interruption 26 of its face as shown so that the interruption 26 of spur gear 24 corresponds radially to the uninterrupted portion of the face of the first spur gear 20. A third spur gear 28 of diameter equal to the second but without an interruption of its face is likewise mounted on the shaft 15.

On another shaft 30 which is journaled with the support frame 12 are provided splined 32 as better shown in FIGURE 2. A sleeve 34 is keyed with slots 36 to slideably engage the splined shaft 30. Securely positioned on the sleeve 34 are first and second pinion gears 38 and 40 respectively.

Referring again now to FIGURE 1, the pinion gears 38 and 40 mounted on the sleeve 34 are capable of lateral sliding movement along the splined shaft 30. FIGURE 1 shows the pinion gears in a position so that pinion gear 38 meshes with spur gear 28. Sliding action of the pinion gears on the sleeve 34 may be accomplished by operating a suitable lever 42 shown in outline so that pinion gear 40 meshes with spur gear 20 and pinion gear 38 meshes with spur gear 24. Lugs 44 are provided to align the pinion gears on the sleeve in this second mesh position with spur gears 20 and 24. When the pinion gears and sleeve are in the second mentioned position, operation of the handle 16 causes the spur gear 20 to turn the pinion gear 40 until such pinion gear experiences the interruption 22 of the face of the spur gear 20. The interruption 26 of the face of the spur gear 24 is positioned such that it is radially adjacent the teeth of uninterrupted portion of spur gear 20. In other words, teeth on the uninterrupted portion of the spur gear 24 are adjacent the interrupted portion of the face of spur gear 20. Thus when the pinion gear 40 arrives at the interruption 22 of the spur gear 20, the pinion gear 38 begins to mesh with the teeth on the face of the spur gear 24. Continuous rotation of the pinion gears and splined shaft 30 is provided but difference in sizes of the pinion and spur gears, as for example shown in FIGURE 1, causes the splined shaft 30 to rotate at continuous but alternating slow-fast speeds.

The splined shaft 30 is provided with a bevel gear 46 securely mounted on the end opposite the journal. The bevel gear 46 in turn engages a second bevel gear 48 securely mounted on a shaft 50 journaled with the support frame 12 and communicating with the winding spool 18. Thus rotation of the splined shaft 30 in turn imparts rotary movement of the spool 18. If the pinion gear 38 is in engagement with the spur gear 28, the spool 18 will rotate at constant speed providing conventional reel action. However, if the pinion gears are in engagement with the interrupted spur gears, the spool 18 will rotate in a "professional" or alternating slow-fast movement. Of course, this action is imparted by the spool 18 to a conventional line and suitable bait attached thereto.

It will be recognized that the winding spool 18 may be of a suitable type having conventional line guide means. If desired, the spool shaft may be further journaled such as with a support 60.

Referring now to FIGURE 3, the lever handle 42 shown by outline in FIGURE 1 is presented in detail. The lever is comprised of fingers 62 which are positioned between the pinion gears 38 and 40. The lever is pivoted such as by pin 64 to the top of the support frame 12 so that the lever is clear of the spur gears. A clip 66 attached to the frame 12 receives the body of the lever 42. Thus if the lever is constructed of a flexible material, the pivot pin 64 and receiver 66 provide a spring biasing action so that simple thumb operation of the lever 42 will cause the lever fingers 62 to slide the pinion gears 38 and 40 and sleeve 34 along the splined shaft 30 into engagement with either the spur gear 28 or the interrupted spur gears 20 and 24 as desired.

In operation, a conventional fishing line with a bait attached is threaded or otherwise secured to the spool 18. Of course, it is understood that the fishing reel 10 of the present invention is attached as usual to a fishing rod. The line is wound around the spool and the bait is cast. Thereupon the winding handle 16 is operated and the pinion gears 38 and 40 are moved into engagement with interrupted spur gears 20 and 24 by appropriate thumb adjustment of the lever 42. The winding handle 16 is operated which causes the keyed sleeve 34 to coact with the splined shaft 30 thereby imparting alternating slow-fast movement to the spool 18 by virtue of the interrupted faces of the spur gears coacting with the pinion gears. "Professional" action is in turn imparted to the bait through the spool 18.

With reference to FIGURE 4, a partial cross-sectional top view of a modified embodiment of the present invention is shown. The modification is basically similar to the device shown in FIGURE 1 with slight changes in the gear box which is represented generally by the reference numeral 100. In this modified form, a shaft 102 is journaled at both ends to support frame 104. Splines 106 engage a keyed sleeve 108 on which is securely mounted a spur gear 110 and a pinion gear 112. The spur gear 110 has an interruption 114 of only a portion of the width and circumference of its face. The pinion gear 112 has an interruption 116 of its face corresponding radially to the portion of spur gear 110 which is uninterrupted across the full width of its face. A second shaft 118 is journaled at one end with the support frame 104 and is provided with a securely mounted spur gear 120 and pinion gear 122. When the gears are in engagement as shown, alternating slow-fast movement of the shaft 118 is provided since the pinion 122 meshes with the spur gear 110. When the pinion gear 122 reaches the interrupted portion 114 of the spur gear 110, the spur gear 120 will mesh with the uninterrupted portion of the pinion gear 112. By appropriate operation of the lever 124, the spur gear 110 and pinion gear 112 mounted on the sleeve 108 may be slid along the splines 106 of the shaft 102 so that the pinion gear 112 and spur gear 120 do not mesh and the pinion gear 122 and spur gear 110 are in continuous engagement. In this latter position, standard reeling action is provided.

FIGURES 5 and 6 show further modifications of the present invention by using different gear configurations in the gear box. Thus in FIGURE 5, bevel gears 200 and 202 may mesh and provide standard reel action of the bevel gears 204 and 206 and interrupted bevel gears 208 and 210 may coact to provide alternating slow-fast or "professional" reeling action. FIGURE 6 shows a crown gear arrangement in a gear box to accomplish the alternating slow-fast action or standard reeling action. Interrupted bevel gears 300 and 302 mesh with crown gears 304 and 306 to produce "professional" movement or bevel gear 308 may mesh with crown gear 310 to produce standard reeling action.

A slightly different gear box arrangement is shown in FIGURE 7 wherein a sliding gear arrangement in a gear box accomplishes "professional" or standard reeling action as desired. A sleeve 400 is slidably mounted such as by key and spline as previously described on a shaft 402 journaled with the support frame 404 at both ends and communicating with a winding handle 406 at one end. Mounted on the sleeve 400 are a pionion gear 408 and a spur gear 410. The spur gear 410 is capable of meshing with a pionion gear 412 which mounted on a second shaft 414 also journaled with the support frame 404. The pinion gear 408 is capable of meshing with a spur gear 416 securely mounted on the shaft 414. The shaft 414 communicates with a winding spool in a manner such as explained in regard to previously described embodiments of the present invention.

A helical cam 418 is provided on the sleeve 400 and is engaged by a disengageable cam follower 420. When the cam follower 420 engages the helical cam 418, the sleeve 400 slides back and forth across the shaft 402 so that the spur gear 410 engages and then disengages the pinion gear 412 and the pinion gear 408 engages and then disengages the spur gear 416 in an alternating manner. By virtue of differing sizes of the pinion and spur gears, an alternating slow-fast movement is provided. If the cam follower 420 is disengaged from the helical cam 418, an expansion spring 422 concentrically mounted on the shaft 402 between the support frame 404 and the sleeve 400 forces the sleeve 400 into a position such that the spur gear 410 meshes continuously with the pinion gear 412 to produce standard reeling action when the winding handle 406 is operated. Thus still another gear box arrangement is provided to produce either conventional or "professional" reeling action.

It is to be recognized that the objects of the present invention may be accomplished by use of varying gear ratios or gear diameter sizes to produce desired reeling speeds and differential speeds in the alternating slow-fast take up movement. Furthermore, in the interrupted gear embodiments of the present invention, faces of either the spur or pinion gears may be interrupted so long as such interruptions corresponding radially to produce continuous reeling action.

The present invention, therefore, is well-adapted to carry out the objects and attain the ends and advantages mentioned as well as others inherent therein. While presently preferred embodiments of the invention have been given for the purpose of disclosure, numerous changes in the details of construction, and the combination, shape, size, arrangement of parts, and uses may be resorted to without departing from the spirit and scope of the invention as hereinafter claimed.

What is claimed is:

1. A fishing reel for imparting rhythmic action in a bait attached to a line including, a spool on which the line is wound, a winding handle, and means including interrupted gear means connecting the spool and winding handle for alternating take-up of the line fast and slow by continuous rotation of the handle.

2. The fishing reel of claim 1 wherein the means including interrupted gear means connecting the spool and winding handle for alternating take-up of the line fast and slow by continuous rotation of the handle include, support means for coaction with the spool and handle, a first shaft rotatably connected with said support means and to which the handle is secured, a first spur gear securely mounted on said first shaft and having an interruption of a portion of its face, a second spur gear of smaller diameter than the first securely mounted on the first shaft and having an interruption of its face corresponding radially to the uninterrupted portion of the face of the first spur gear, a third spur gear of diameter equal to that of the second spur gear securely mounted on the first shaft, a second shaft splined and rotatably connected with said support means and the spool and parallel to the first shaft, a sleeve slideably engaging the splined second shaft, first and second pinion gears securely attached to said sleeve for engagement with the spur gears, and means for sliding the sleeve to engage the pinion gears with the first and second spur gears for rhythmic reel action as well as to engage the second pinion gear with the third spur gear for conventional reel action.

3. The fishing reel of claim 1 wherein the means including interrupted gear means connecting the spool and winding handle for alternating take-up of the line fast and slow by continuous rotation of the handle include, support means for coaction with the spool and handle, a first shaft rotatably connected with said support means and engaging the handle, a first spur gear securely mounted on said first shaft and having an interruption of a portion of its face, a second spur gear of smaller diameter than the first securely mounted on the first shaft and having an interruption of its face corresponding radially to the uninterrupted portion of the face of the first spur gear, a third spur gear of diameter equal to that of the second spur gear securely mounted on the first shaft, a second shaft splined and rotatably connected with said support means and the spool and parallel to the first shaft, a sleeve slideably engaging the splined second shaft, first and second pinion gears securely attached to said sleeve for engagement with the spur gears, and means for sliding the sleeve to engage the pinion gears with the spur gears for normal or rhythmic reel action as well as to engage the second pinion gear with the third spur gear for conventional reel action.

4. The fishing reel of claim 1 wherein the means including interrupted gear means connecting the spool and winding handle for alternating take-up of the line fast and slow by continuous rotation of the handle include, support means for coaction with the spool and handle, a first shaft rotatably connected with said support means and to which the handle is secured, a first spur gear securely mounted on said first shaft and having an interruption of a portion of its face, a second spur gear of smaller diameter than the first securely mounted on the first shaft and having an interruption of its face corresponding radially to the uninterrupted portion of the face of the first spur gear, a second shaft rotatably connected with said support means and the spool and parallel to the first shaft, and first and second pinion gears securely attached to said second shaft for engagement with the spur gears.

5. The fishing reel of claim 1 wherein the means including interrupted gear means connecting the spool and winding handle for alternating take-up of the line fast and slow by continuous rotation of the handle include, support means for coaction with the spool and handle, a first shaft rotatably connected with said support means and engaging the handle, a first spur gear securely mounted on said first shaft and having an interruption of a portion of its face, a second spur gear of smaller diameter than the first securely mounted on the first shaft and having an interruption of its face corresponding radially to the uninterrupted portion of the face of the first spur gear, a second shaft rotatably connected with said support means and the spool and parallel to the first shaft, and first and second pinion gears securely attached to said second shaft for engagement with the spur gears.

6. The fishing reel of claim 1 wherein the means including interrupted gear means connecting the spool and winding handle for alternating take-up of the line fast and slow by continuous rotation of the handle include, support means for coaction with the spool and handle, a first shaft rotatably connected with said support means and rotatably engaging the spool, a first pinion gear securely mounted on the first shaft, a second pinion gear of greater diameter than the first securely mounted on the first shaft, a second shaft splined and rotatably connnected with said support means and the handle and parallel to the first shaft, a sleeve slideably engaging the splined second shaft, a first spur gear securely attached to the sleeve for engagement with the first pinion gear and having an interruption of a portion of the width and circumference of its face, a second spur gear of smaller diameter than the first securely attached to the sleeve for engagement with the second pinion gear and having an interruption of its face corresponding radially to the uninterrupted portion of the face of the first spur gear, and means of sliding the sleeve to shift engagement of the spur gears with the pinion gears for normal or rhythmic reel action.

7. The fishing reel of claim 1 wherein the means including interrupted gear means connecting the spool and winding handle for alternating take-up of the line fast and slow by continuous rotation of the handle include, support means for coaction with the spool and handle, a first shaft rotatably connected with said support means and the spool, a first pinion gear securely mounted on the first shaft, a second pinion gear of greater diameter than the first securely mounted on the first shaft, a second shaft splined and rotatably connected with said support means parallel to the first shaft and rotatably engaging the handle, a sleeve slideably engaging the splined second shaft, a first spur gear securely attached to the sleeve for engagement with the first pinion gear and having an interruption of a portion of the width and circumference of its face, a second spur gear of smaller diameter than the first securely attached to the sleeve for engagement with the second pinion gear and having an interruption of its face corresponding radially to the uninterrupted portion of the face of the first spur gear, and means for sliding the sleeve to shift engagement of the spur gears with the pinion gears for normal or rhythmic reel action.

8. A fishing reel for imparting rhythmic action in a bait attached to a line including,
a spool on which the line is wound,
a winding handle, and
means including interrupted bevel gear means connecting the spool and winding handle for alternating take-up of the line fast and slow by continuous rotation of the handle.

9. A fishing reel for imparting rhythmic action in a bait attached to a line including,
a spool on which the line is wound,
a winding handle, and
interrupted crown gear means connecting the spool and winding handle for alternating take-up of the line fast and slow by continuous rotation of the handle.

10. A fishing reel for imparting rhythmic action in a bait attached to a line including,
a spool on which the line is wound,
a winding handle, and
means including helical cam means and sliding gear means connecting the spool and winding handle for alternating take-up of the line fast and slow by continuous rotation of the handle.

11. In a fishing reel for imparting rhythmic action in a bait attached to a line, the combination with a spool on which the line is wound and a winding handle of improved gear means including,
support means for coaction with the spool and handle,
a first shaft rotatably connected with said support means and to which the handle is secured,
a first spur gear securely mounted on said first shaft and having an interruption of a portion of its face,
a second spur gear of smaller diameter than the first securely mounted on the first shaft and having an interruption of its face corresponding radially to the uninterrupted portion of the face of the first spur gear,
a third spur gear of diameter equal to that of the second spur gear securely mounted on the first shaft,
a second shaft splined and rotatably connected with said support means and the spool and parallel to the first shaft,
a sleeve slideably engaging the splined second shaft, first and second pinion gears securely attached to said sleeve for engagement with the spur gears, and
means for sliding the sleeve to engage the pinion gears with the first and second spur gears for rhythmic reel action as well as to engage the second pinion gear with the third spur gear for conventional reel action.

12. In a fishing reel for imparting rhythmic action in a bait attached to a line, the combination with a spool on which the line is wound and a winding handle of improved gear means including,
support means for coaction with the spool and handle,
a first shaft rotatably connected with said support means and engaging the handle,
a first spur gear securely mounted on said first shaft and having an interruption of a portion of its face,
a second spur gear of smaller diameter than the first securely mounted on the first shaft and having an interruption of its face corresponding radially to the uninterrupted portion of the face of the first spur gear,
a third spur gear of diameter equal to that of the second spur gear securely mounted on the first shaft,
a second shaft splined and rotatably connected with said support means and the spool and parallel to the first shaft,
a sleeve slideably engaging the splined second shaft, first and second pinion gears securely attached to said sleeve for engagement with the spur gears, and
means for sliding the sleeve to the pinion gears with the spur gears for normal or rhythmic reel action as well as to engage the second pinion gear with the third spur gear for conventional reel action.

References Cited

UNITED STATES PATENTS

| | | | |
|---|---|---|---|
| 889,974 | 6/1908 | Schreidt | 242—84.54 |
| 1,542,403 | 6/1925 | Miles | 242—84.54 |
| 1,559,927 | 11/1925 | Baker | 242—84.54 |
| 3,166,267 | 1/1965 | Rowe | 242—84.2 |
| 3,187,600 | 6/1965 | Seybold | 74—393 |

FOREIGN PATENTS 921,060 12/1954 Germany.

BILLY S. TAYLOR, *Primary Examiner.*